Patented Jan. 24, 1939

2,144,643

UNITED STATES PATENT OFFICE 2,144,643

SHEET METAL AND METHOD OF PRODUCING THE SAME

Robert R. Tanner, Detroit, Mich., assignor, by mesne assignments, to The Patents Corporation, Detroit, Mich., a corporation of Michigan No Drawing. Application March 23, 1935, Serial No. 12,646

9 Claims. (Cl. 29—148)

This application relates to sheet metal and the treatment thereof, and more particularly to the coating of ferrous sheets with metal more resistant to corrosion and the preparation of these coated sheets for the reception of paint without interfering with intermediate working and shaping of the sheets before the paint is applied.

The object of the invention is to prepare sheet metal in such a way that it will be satisfactorily resistant to corrosion during transportation and manufacture, so that it can be bent, spot welded and otherwise treated in the usual manufacturing processes without difficulty, and will present a surface to which paint, varnish or other finishing coats will adhere firmly.

It is well known that bare metal is not a good surface to hold paint, varnish or the like. Metal surfaces have been treated to provide them with phosphate coatings and the like to which paint, varnish and enamel will adhere very well, but these coatings which have formed very satisfactory bonds for paint are troublesome when sheets to which they have been applied are spot welded, and are sometimes injured by other manufacturing processes.

By this invention ferrous sheets are prepared in such a way that rusting is prevented or retarded, the sheets may be spot welded and will readily withstand all ordinary manufacturing processes and still present a very good paint bonding surface to which paint will adhere much more readily than to bare metal. One embodiment of the invention will be described in some detail and then some variations thereof will be indicated.

A specific embodiment of the invention chosen for detailed description relates to the treatment of iron or steel sheets by first coating them with zinc electrolytically, by galvanizing, or in any other suitable manner. Thereafter the zinc-coated sheet is subjected to a solution which produces thereon a surface coating on which paint is more adherent than to bare metal. Preferably this coating operation immediately follows the step of coating with zinc so that no intermediate cleaning operation is necessary. A satisfactory solution for coating electrolytic zinc may be made up as follows:

| | |
|---|---|
| Water cc | 2000 |
| Nickel sulphate grams | 30 |
| Zinc grams | 1½ |
| Cadmium sulphate gram | ½ |
| Strong sulphuric acid drops | 9 |

The sulphuric acid is merely to neutralize the tap water employed. The zinc is to give the solution an initial composition somewhat similar to that which will result anyway from the dissolving of the zinc in the solution as it is used. The cadmium sulphate accelerates the coating action appreciably.

When a sheet having electrolytic zinc thereon is boiled in such a solution there is formed on the surface in a very short time a coating, mostly oxide, which is thin and adherent and, while it is somewhat more resistant to electric current than the bare metal, it does not interfere with spot welding. On the contrary, the extra resistance of this coating at the surface of the zinc tends somewhat to restrict the area melted during spot welding and prevent melting and spattering of the zinc coating. Also such a sheet may be readily bent and drawn to an appreciable extent without disturbing the coating thereon. Accordingly, a sheet prepared in this manner may be stored or shipped and then manufactured by the usual methods which involve bending, shaping, spot welding, etc., and the finished article then presents a surface to which paint adheres much more readily than to bare metal, and the finished article is quite resistant to corrosion, as it does not rust under the paint or enamel as readily as articles made of ferrous sheets treated in customary ways.

While it is preferred to coat the ferrous sheets electrolytically, since a coating may be more easily deposited in this manner which will be sufficient for the purposes of this invention and still will be so thin and adherent that it will not be injured by the usual bending and drawing methods, and for the further reason that electrolytic zinc is somewhat more easily coated by most coating solutions than galvanized metal, in its broader aspects the invention comprises also the preparation of the sheets by galvanizing or other coating methods.

When the sheets are galvanized, it is preferable to form a relatively thin coating of zinc, as that will withstand bending and manufacturing operations more readily than a thick coating. Even the thin galvanized coating will not withstand bending or drawing as well as the electrolytic coating. Also the galvanized surface, as indicated above, is somewhat more difficult to coat than is the electrolytic zinc. When galvanized sheets are to be treated, it is best to add to the above described formula a small amount of nitric acid, say 10 cc, and to double the amount of the cadmium compound.

When either of the solutions are used, if they are employed as a bath and repeated loads of sheets are coated therein, it will be necessary to replenish the solution from time to time, but the amount and proportion of the replenishing materials will vary with the conditions employed, and the required replenishment may be determined from time to time by chemical analysis of the solution, as will be readily understood.

It will be readily understood that an oxide coating on the zinc may be produced in any other suitable manner which will result in an equivalent coating. A great many different acids accompanied by oxidizing agents may be employed by proper selection of strength and proportion of the ingredients and it is not the purpose of this application to set forth in detail the many different combinations which may be employed to produce oxide coatings on zinc.

There are also numerous solutions containing salts of metals other than nickel sulphate which will produce on the surface of zinc a coating of metallic oxides or a mixture of oxides and deposited metal which will have characteristics very similar to those described above.

For example, a 2% solution of $CoCl_2$ produces very quickly a hard black coat. The addition of .01% copper nitrate noticeably softens this coating so as to increase the adherence of paint, and the metal coated in this way welds satisfactorily. In this connection it may be pointed out that a too heavy or thick coating, especially too porous a coating, of the more resistant material may interfere with welding by the ordinary spot welding means because of the increased resistance, if for no other reason. Instead of copper, a trace of antimony may be employed with similar results, and a very similar coating can be produced by a solution containing cobalt nitrate instead of chloride.

While, as indicated above, many different acids can be used with compatible oxidizing agents for producing an oxide coating on zinc, and various compounds of metals may be employed which will deposit the metal or compounds thereof to some extent upon the zinc surface, there may be pointed out one or two particular examples where unusual results are obtainable.

Citric acid is in somewhat of a class by itself since it may be employed with compounds of metal and/or with an oxidizing agent to produce coatings on zinc which consist essentially of the oxide of zinc and the metal employed as an accelerator, or the oxide thereof, and also under certain circumstances it may be employed to produce a citrate of zinc and other metals on the surface mingled to a varying degree with the oxide. For example, a solution consisting of 1% citric acid, 2½% sodium nitrate and ½% nickel carbonate will quickly produce on the zinc surface a hard, uniform, clean coating that welds satisfactorily. Also a 2½% solution of citric acid, 1% ferric sulphate and ½% sodium nitrate will coat zinc readily. A peculiarity of this solution is that, while it will coat zinc either hot or cold, there appears to be no citrate in the coating when the temperature of the solution is not above 65° C., but at boiling the coating consists largely of citrates of iron and zinc. By varying the temperature and the composition any desired relation between the citrate and oxide may be readily obtained. Apparently the coating at the lower temperature is largely magnetic oxide of iron.

Many different compounds of metal may be employed in a citric acid solution for coating zinc, and the strength of the solution may be varied greatly, the percentages given being merely by way of example. In general it may be stated, however, that, with room temperatures or thereabouts, the coatings produced by these various compounds of metal in citric acid solutions on zinc consist mainly of the metals themselves or their oxides, although with a copper compound dissolved in a citric acid solution a coating can be produced on zinc at room temperature which comprises citrate. Many of the other compounds of metals produce deposits of the metals themselves or their oxides only, even at elevated temperatures, but compounds of arsenic, antimony, cobalt, nickel, copper and iron in a citric acid solution, at boiling or thereabouts, produce coatings containing citrate. A 5% solution of citric acid with a 1% solution of a salt of the various metals mentioned coats quite successfully, but the coating action is improved by the addition of a small amount, say ½% sodium nitrate.

The use of citric acid has been particularly discussed, not because it constitutes in itself a part of the present invention, but because it lends itself so readily to a treatment which, by the use of selected compounds of metals and the selection of the temperature, will result in almost any desired thickness and texture of coating from very hard and thin to coatings as soft and thick as desired, it, of course, being very easy by excessive use of the various metals in relation to the acidity of the solution to deposit them so rapidly that a loose and useless coating results. However, by judicious modification of the solution in ways which will be readily apparent to any chemist, in view of the foregoing disclosure, a coating can be produced having the desired characteristics both as to texture and composition, as coatings can be produced containing the metal accelerator or accelerators in metallic form, as oxides, as citrates, or in any combination of these forms. It may be repeated that too great electrical resistance in the coating is troublesome in spot welding with the apparatus and methods customarily employed for that purpose.

While other ingredients may be present in the coating on the zinc, as indicated above, the most desirable coatings found in practice have contained a substantial amount of oxide of zinc and/or other metal employed in the coating solution.

In the appended claims, the term "siccative coat" is employed to cover coatings such as paint, varnish or enamel which are formed of materials applied to and dried or baked onto the surface, in distinction from coatings which are formed by chemical reaction with the surface to be coated.

What I claim is:

1. A ferrous sheet having thereon a thin coating of zinc and the surface of the zinc having thereon a substantially uniform coating, produced by the action of acid, containing a substantial amount of metal oxide, sufficiently thin and adherent to allow of spot welding, bending and shaping in the manufacture of articles from the sheet, and forming a paint-bonding coat.

2. A ferrous sheet having thereon a thin electrolytically deposited coating of zinc and the surface of the zinc having thereon a coating, containing a substantial amount of metal oxide, sufficiently thin and adherent to allow of spot welding, bending and shaping in the manufacture of articles from the sheet, and forming a paint-bonding coat.

3. The method which consists in coating a ferrous sheet with a thin coating of zinc, then treating the sheet with an acid solution and thereby producing on the surface of the zinc a coating comprising metal oxide, manufacturing the coated sheet into an article, and applying a siccative coat to the article.

4. The method which consists in coating a ferrous sheet with a thin coating of zinc, producing on the surface of the zinc a coating comprising metal oxide, manufacturing the coated sheet into an article by steps including spot welding, and applying a siccative coat to the article.

5. The method which consists in electrolytically coating a ferrous sheet with a thin coating of zinc, producing on the surface of the zinc a coating comprising metal oxide, manufacturing the coated sheet into an article by steps including shaping, and applying a siccative coat to the article.

6. The method which consists in electrolytically coating a ferrous sheet with a thin coating of zinc, producing on the surface of the zinc a coating comprising metal oxide, manufacturing the coated sheet into an article by steps including spot welding, and applying a siccative coat to the article.

7. The method which consists in electrolytically coating a ferrous sheet with a thin coating of zinc, producing on the surface of the zinc a coating comprising metal oxide, manufacturing the coated sheet into an article by steps including shaping and spot welding, and applying a siccative coat to the article.

8. The method which consists in electrolytically coating a ferrous sheet with a thin coating of zinc, then treating the sheet with an acid solution and thereby producing a uniform paint holding coating thereon consisting principally of zinc oxide, manufacturing the coated sheet into an article, and thereafter applying a siccative coat to the surface of the article.

9. The method which consists in electrolytically coating a ferrous sheet with a thin coating of zinc, then treating the sheet with an acid solution and thereby producing on its surface a substantially uniform coating consisting principally of zinc oxide suitable for bonding a siccative coat uniformly to the surface of the metal, manufacturing the coated sheet into an article by steps including shaping and spot welding, and applying a siccative coat to the article.

ROBERT R. TANNER.